United States Patent [19]

Matsumoto

[11] Patent Number: 4,827,358
[45] Date of Patent: May 2, 1989

[54] APPARATUS FOR RECORDING DATA IN SUITABLE FORMAT DEPENDING ON THE SIZE OF THE RECORDING MATERIAL

[75] Inventor: Kozo Matsumoto, Tokyo, Japan

[73] Assignee: Canon Kabushiki Kaisha, Tokyo, Japan

[21] Appl. No.: 147,578

[22] Filed: Jan. 19, 1988

Related U.S. Application Data

[63] Continuation of Ser. No. 726,826, Apr. 24, 1985, abandoned.

[30] Foreign Application Priority Data

May 9, 1984 [JP] Japan ................................ 59-90882

[51] Int. Cl.⁴ ............................................. H04N 1/21
[52] U.S. Cl. ..................................... 358/296; 340/730
[58] Field of Search ............... 358/296, 298; 355/3 R; 340/730, 731, 735

[56] References Cited

U.S. PATENT DOCUMENTS

| | | | |
|---|---|---|---|
| 4,270,172 | 5/1981 | Tidd | 340/730 |
| 4,521,814 | 6/1985 | Ono | 358/296 |
| 4,546,449 | 10/1985 | Masaki | 364/900 |
| 4,549,222 | 10/1985 | Fogaroli | 358/296 |
| 4,587,569 | 5/1986 | Nakamura | 358/296 |
| 4,593,407 | 6/1986 | Konishi | 340/727 |

FOREIGN PATENT DOCUMENTS

51-89340 8/1976 Japan.

Primary Examiner—E. A. Goldberg
Assistant Examiner—Mark Reinhart
Attorney, Agent, or Firm—Fitzpatrick, Cella, Harper & Scinto

[57] ABSTRACT

There is disclosed a recording apparatus capable of data recording with a suitable size according to the size of the recording sheet. There are provided plural pattern generators to generate plural different patterns for each character code, and one of the patterns is selected according to the size of the recording sheet.

6 Claims, 5 Drawing Sheets

5 INCH

10 INCH

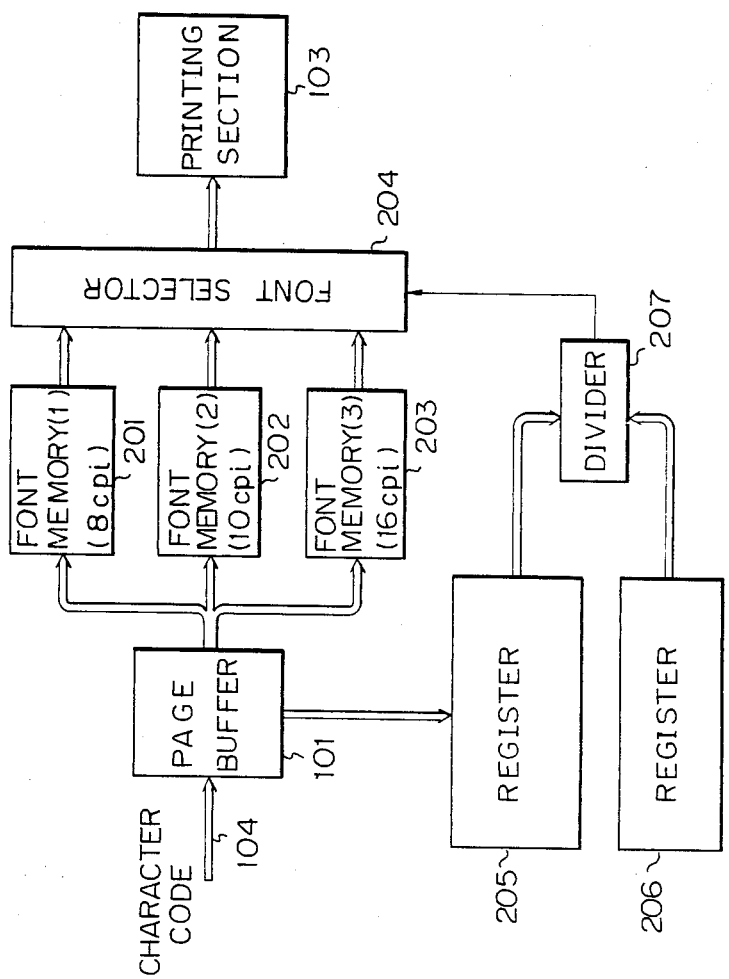

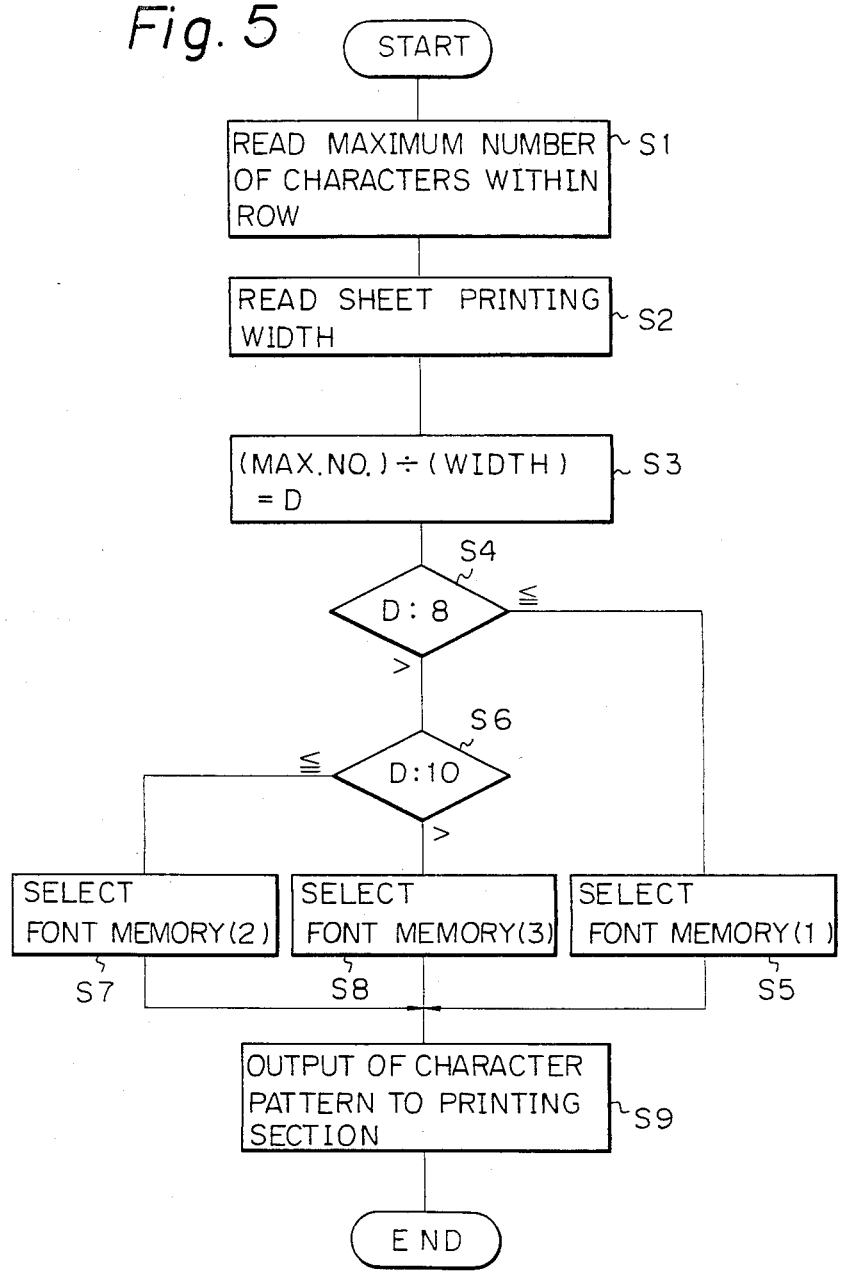

5 INCH

10 INCH

APPARATUS FOR RECORDING DATA IN SUITABLE FORMAT DEPENDING ON THE SIZE OF THE RECORDING MATERIAL

This application is a continuation of application Ser. No. 726,826 filed Apr. 24, 1985, now abandoned.

BACKGROUND OF THE INVENTION

1. Field of the Invention

The present invention relates to a recording apparatus capable of data recording with a suitable size according to the size of the recording material.

2. Description of the Prior Art

Conventional recording apparatus are constructed to accommodate the recording sheets of various sizes according to the purpose of use, but the data, if printed in identical manner on sheets of different sizes, may appear too short or too long according to the size of the sheet, or become positionally unbalanced on the sheet. The user has therefore had to re-edit the data by suitably changing the number of characters in a line or the number of lines on the sheet according to the size thereof, in order to adequately locate the recording in a sheet. In the following there will be given an explanation on the conventional technology, while making reference to the attached drawings.

Referring to FIG. 1, a page buffer 101 stores character code data of at least one page, supplied for example from a host computer through an input signal line 104. A font memory 102 stores, in a read-only memory (ROM) or a random access memory (RAM), the dot patterns of all the printable characters in the addresses corresponding to the character codes, and releases a character dot pattern in response to a character code read from the page buffer 101. A printing section or unit 103 electrically or mechanically prints, on a recording sheet, the character dot pattern read from the font memory 102.

As an example, in case of a laser beam printer, the dot patterns read from the font memory 102 are converted into serial signals which are used for modulating a laser beam for scanning a photosensitive member, thereby obtaining a black-and-white data print.

FIG. 2 shows an example of data print obtained in such conventional printing apparatus, with a print pitch of 10 cpi (characters/inch) on the sheet of a certain size, for example with a printable width of 8 inches.

In FIG. 3, (a) and (b) respectively show print examples of identical data on sheets with printable widths of 5 and 10 inches.

In case of (a), the printed data are partially lacking as each line is interrupted at the right-hand end because the printable width of the used sheet is narrower than 8 inches. On the other hand, in case of (b), the printed data are too small for the sheet size and unaesthetic since the printable width of the used sheet is too large.

SUMMARY OF THE INVENTION

In consideration of the foregoing, an object of the present invention is to provide a recording apparatus capable of adequate data recording.

Another object of the present invention is to provide a recording apparatus capable of data recording with a suitable size according to the size of the recording material.

Still another object of the present invention is to provide a recording apparatus capable of recording all the data on a recording material.

Still another object of the present invention is to provide a recording apparatus capable of data recording in a size not too small for the size of the recording material.

Still another object of the present invention is to provide a recording apparatus capable of selecting a determined recording pattern from recording patterns of plural sizes according to the size of recording material or the number of patterns to be recorded.

The foregoing and still other objects will become fully apparent from the following description.

BRIEF DESCRIPTION OF THE DRAWINGS

FIG. 4 is a block diagram showing data flow in an embodiment of the recording apparatus of the present invention;

FIG. 5 is a flow chart showing the procedure of selecting character font; and

DETAILED DESCRIPTION OF THE PREFERRED EMBODIMENTS

Now the present invention will be clarified in detail by an embodiment thereof shown in the attached drawings, wherein same or similar components are represented by a same reference number.

Figure 1:
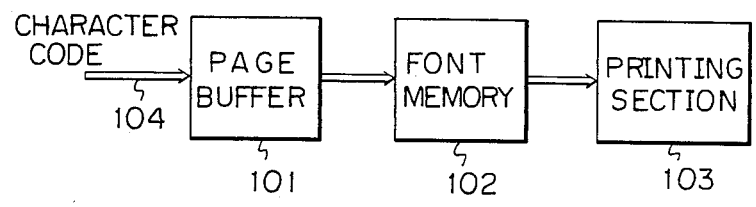
FIG. 1 is a block diagram showing data flow in a conventional recording apparatus.

FIG. 4 is a block diagram of an embodiment of the present invention, wherein a page buffer 101, a printing unit 103 and an input signal line 104 have same functions as those shown in FIG. 1.

The present embodiment is featured by a fact that plural character dot patterns of different sizes are prepared corresponding to each character code, and the character dot pattern of an optimum size is automatically selected according to the number of characters to be printed in a line and the size of the printing sheet to be employed.

In FIG. 4 there are provided font memories (1) 201, (2) 202 and (3) 203 which respectively store character patterns of different sizes, for example of 8 cpi, 10 cpi and 16 cpi.

A font selector 204 selects one of the character patterns read from said three font memories and supplies the thus selected character pattern to the printing unit 103 for printing on the recording sheet.

A maximum character number register 205 stores, based on the character code data on a page stored in the page buffer 101, the number of characters in a line that contains the largest number of characters in the page. Said number of characters is usually obtained by counting the number of characters at the entry of character code data of each line from the host computer.

A printable width register 206 stores the value of printable width in inches of the recording sheet to be employed, and said value may be set either by a command from the host computer or manually by an unrepresented switch to be manipulated by the operator.

A divider 207 divides the value stored in said maximum character number register 205 with the value stored in said printable width register 206 and instructs the font selector 204 to select a font memory according to the result of said division.

Now reference is made to a flow chart shown in FIG. 5 for explaining the details of the font memory selecting operation of the font selector 204. In the present embodiment the divider 207 is provided with a central processing unit (CPU) which controls the memory selection according to said flow chart.

At first a step S1 reads the maximum number of characters in a line from the maximum character number register 205, and a step S2 reads the printable width of the recording sheet from the printable width register 206. Then a step S3 executes a division D=(maximum number of characters in a line)÷(printable width of the recording sheet), and a step S4 discriminates whether a condition $D \leq 8$ is satisfied. If said condition is satisfied, a step S5 causes the font selector 204 to select the font memory (1). Then a step S6 discriminates whether a condition $8 < D \leq 10$, and, if said condition is satisfied, a step S7 selects the font memory (2). On the other hand, in case of $D > 10$ a step S8 selects the font memory (3). Then a step S9 causes the selected font memory to release the character patterns to the printing unit 103.

In the following there will be detailed the function of the above-described embodiment.

Figure 2:
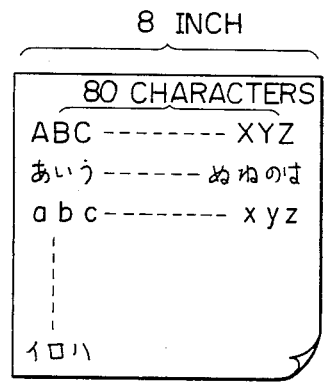
FIGS. 2, 3(a) and 3(b) are views showing examples of data print obtained with a conventional recording apparatus.
Figure 3A:
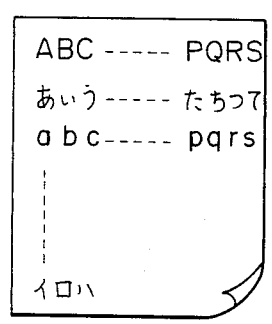
Figure 3B:
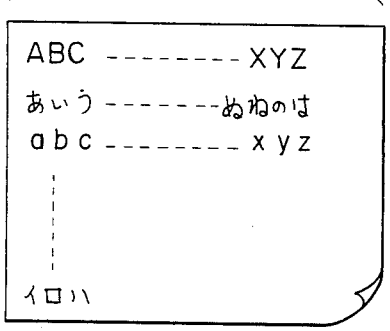
Figure 6A:
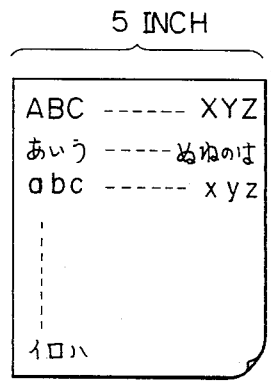
FIGS. 6(a) and 6(b) are views showing example of data print obtained with the recording apparatus of the present invention.
Figure 6B:
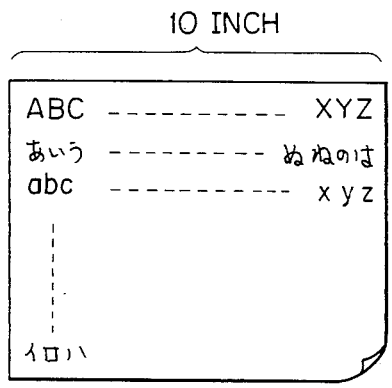

Let us consider a case in which the host computer transmits data of a page, containing 80 characters in each line as shown in FIG. 2. Said data are stored in the page buffer 101, and the maximum character number register 205 stores a value "80". If a recording sheet of a printable width of 8 inches is set so that the printable width register 206 stores a value "8", the divider 207 provides a result "10" to select the character patterns from the font memory (2). Thus 80 characters are recorded with a pitch of 10 cpi within the printable width of the sheet as shown in FIG. 2. Then, in case a recording sheet of a printable width of 5 inches is set so that the printable width register 206 stores a value "5", the divider 207 provides a result "16" to select the character patterns from the font memory (3) 203, whereby 80 characters are recorded with a size of 16 cpi within the printable width of the sheet as shown in FIG. 6(a). In case of a sheet with a printable width of 10 inches the divider 207 provides a result "8" to select the character patterns of the font memory (1) 201, whereby 80 characters are recorded with a size of 8 cpi within the printable width as shown in FIG. 6(b).

As explained in the foregoing, for given character code data supplied from the host computer, largest character patterns that allow to accommodate all the characters within the printable width are automatically selected and printed according to the printable width of the recording sheet to be employed.

In the foregoing example it is assumed that all the lines in a page contain a same number of characters, but, since the maximum character number register 205 retains the number of characters in a line that contains the largest number of characters in the page, all the lines need not contain a same number of characters. The lack in printed data does not occur as the apparatus of the present invention so functions to properly accommodate the line of maximum number of characters within the printable width even if the number of characters varies from line to line.

In the foregoing example, if the result of division by the divider 207 exceeds "16", the obtained print exceeds the printable width of the sheet even with the character patterns of 16 cpi, but such inconvenience can be prevented by preparing character patterns of an even smaller size, and such embodiment is also included in the scope, of the present invention.

Stated differently, the number of species of the font memories and the respective sizes of the corresponding character patterns are not limited to those employed in the foregoing embodiment but can be selected arbitrarily according to the contemplated mode of use of the recording apparatus.

In the foregoing embodiment the size of the character pattern to be printed is selected according to the maximum number of characters in a line and the printable width of the recording sheet, but the present invention is likewise applicable also in the vertical direction. More specifically it is rendered possible to select the maximum character patterns that allow to accommodation of all the lines in a page, by storing the number of lines in a page and the vertical printable length of the recording sheet respectively in the maximum character number register 205 and the printable width register 206 and effecting similar calculations.

In the foregoing it has been explained that the value stored in the printable width register 206 is determined either by a command from the host computer or manually by the operator, but said value may also be automatically set by detecting the size of the recording sheet loaded on the apparatus by means of known optical detecting means.

It is furthermore possible to employ only one font memory and to expand or reduce the size of the character dot pattern released from said font memory by respectively increasing or decreasing the number of dots, according to the size of the recording sheet and the number of characters to be printed in a line.

As explained in the foregoing, it is rendered possible to record data always with an optimum recording size without the inconveniences such as partial lack of printed data or excessively small-sized print even when the sheet size is changed, as the size of recording characters is determined in consideration of the size of the recording sheet and the number of characters.

I claim:

1. A recording apparatus comprising:
    pattern generating means for generating patterns representing characters according to input character code data, said pattern generating means being operable to generate the patterns in mutually different sizes from the same character code data;
    first memory means for storing a page of entered character code data;
    second memory means for counting the number of characters in a line that contains the largest number of characters, based on a page of character code data stored in said first memory means, and for storing data in accordance with the thus-counted number of characters;
    control means for controlling the selection of the size of the patterns generated by said pattern generating means in accordance with the data stored in said second memory means; and
    recording means for recording the patterns on a recording material based on the character coded data stored in said first memory means, with a size selected by said control means.

2. A recording apparatus according to claim 1, wherein said pattern generating means comprises plural font memories for generating patterns of mutually different sizes on the same input data, wherein said control means in operable to select a predetermined font memory from among plural font memories in accordance with the data stored in said second memory means.

3. A recording apparatus according to claim 2, further comprising size data output means for generating data related to the size of the recording material, wherein said control means is operable to select said predetermined font memory in accordance with the size data and the data related to the number of characters stored in said second memory means.

4. A recording apparatus according to claim 1 wherein the size data indicate the printable width.

5. A recording apparatus comprising:
pattern generating means for generating patterns representing characters according to input character code data, said pattern generating means being operable to generate the patterns in mutually different sizes from the same character code data;
output means for generating data related to the size of a recording material;
first memory means for storing a page of entered character code data;
second memory means for counting the number of characters in a line that contains the largest number of characters, based on a page of character code data stored in said first memory means, and for storing data in accordance with the thus-counted number of characters;
control means for controlling the selection of the size of the patterns generated by said pattern generating means in accordance with the size data generated by said output means and character number data stored in said second memory means; and
recording means for recording the patterns on the recording material, based on the character code data stored in said first memory, with a size selected by said control means.

6. A recording apparatus according to claim 5, wherein said control means is operable to carry out arithmetic operation of the size data and character number data, and to select the size of the patterns in accordance with the arithmetic operation result.

* * * * *

UNITED STATES PATENT AND TRADEMARK OFFICE
CERTIFICATE OF CORRECTION

PATENT NO. : 4,827,358
DATED : May 2, 1989
INVENTOR(S) : Matsumoto

It is certified that error appears in the above-identified patent and that said Letters Patent is hereby corrected as shown below:

COLUMN 4

Line 7, "scope," should read --scope--; and

Line 20, "to" should be deleted.

COLUMN 5

Line 5, "in" should read --is--.

Signed and Sealed this

Sixteenth Day of January, 1990

*Attest:*

JEFFREY M. SAMUELS

*Attesting Officer*     *Acting Commissioner of Patents and Trademarks*